(12) United States Patent
Monk

(10) Patent No.: US 10,487,480 B2
(45) Date of Patent: Nov. 26, 2019

(54) WATER LEAK DETECTION AND PREVENTION DEVICE

(71) Applicant: Monk Intellectual Properties LLC, Jupiter, FL (US)

(72) Inventor: David T. Monk, Tequesta, FL (US)

(73) Assignee: Monk Intellectual Properties, LLC, Jupiter, FL (US)

(*) Notice: Subject to any disclaimer, the term of this patent is extended or adjusted under 35 U.S.C. 154(b) by 405 days.

(21) Appl. No.: 15/340,390

(22) Filed: Nov. 1, 2016

(65) Prior Publication Data

US 2017/0121950 A1  May 4, 2017

Related U.S. Application Data

(60) Provisional application No. 62/249,969, filed on Nov. 3, 2015.

(51) Int. Cl.
| | |
|---|---|
| *E03B 7/07* | (2006.01) |
| *G01M 3/04* | (2006.01) |
| *D06F 39/08* | (2006.01) |

(52) U.S. Cl.
CPC ............ *E03B 7/071* (2013.01); *D06F 39/081* (2013.01); *G01M 3/042* (2013.01); *Y10T 137/0452* (2015.04); *Y10T 137/1842* (2015.04); *Y10T 137/7727* (2015.04)

(58) Field of Classification Search
CPC ......... Y10T 137/7727; Y10T 137/0452; Y10T 137/7839–7939; Y10T 137/1842; E03B 7/071; D06F 39/081; G01M 3/042
See application file for complete search history.

(56) References Cited

U.S. PATENT DOCUMENTS

| | | | | |
|---|---|---|---|---|
| 187,373 | A * | 2/1877 | Goodwin ................ | F16K 21/04 251/237 |
| 203,590 | A * | 5/1878 | Colborne .............. | F16K 15/026 137/516.25 |
| 749,810 | A * | 1/1904 | Truman .................. | F16K 15/04 137/519.5 |
| 1,518,461 | A * | 12/1924 | Smith .................... | F16K 17/285 137/460 |
| 2,475,585 | A * | 7/1949 | Baird ...................... | F16K 17/26 137/496 |
| 2,576,168 | A * | 11/1951 | Allen ...................... | F16K 35/06 137/384.6 |
| 2,724,401 | A * | 11/1955 | Page ..................... | F24H 9/2035 122/14.3 |
| 2,798,503 | A | 7/1957 | Carver et al. | |
| 3,472,253 | A * | 10/1969 | Bartz ..................... | F16K 17/40 137/172 |
| 3,874,403 | A * | 4/1975 | Fischer ................. | D06F 39/081 134/57 D |
| 3,920,031 | A * | 11/1975 | Maxfield .................. | F17D 5/02 137/312 |

(Continued)

*Primary Examiner* — Mary E McManmon
*Assistant Examiner* — Frederick D Soski
(74) *Attorney, Agent, or Firm* — McHale & Slavin, P.A.

(57) ABSTRACT

A water leak detection and prevention device comprised of a leak detection apparatus positioned near a water-dependent appliance to monitor for moisture due to a leak, and a leak prevention system connected to the leak detection apparatus in fluid communication with a water pipe attached to the water-dependent appliance and positioned in-line with the water pipe is disclosed.

20 Claims, 4 Drawing Sheets

(56) References Cited

U.S. PATENT DOCUMENTS

| | | | |
|---|---|---|---|
| 4,294,276 A * | 10/1981 | Harrison | F16K 17/36 137/550 |
| 4,374,379 A | 2/1983 | Dennison, Jr. | |
| 4,513,776 A * | 4/1985 | Chen | F16K 17/22 137/460 |
| 4,570,311 A | 2/1986 | Kawamura et al. | |
| 4,670,939 A * | 6/1987 | Fisher | E05F 3/223 16/297 |
| 4,843,305 A | 6/1989 | Akiba | |
| 4,909,274 A * | 3/1990 | Rodriguez | E03D 3/00 122/14.3 |
| 5,188,143 A | 2/1993 | Krebs | |
| 5,240,022 A | 8/1993 | Franklin | |
| 5,586,589 A * | 12/1996 | Voelker | B65D 47/24 141/349 |
| 5,601,111 A * | 2/1997 | Sodergard | E03F 5/22 137/498 |
| 5,632,302 A * | 5/1997 | Lenoir, Jr. | F16K 31/02 122/504.2 |
| 6,024,116 A * | 2/2000 | Almberg | F16K 31/003 122/504 |
| 6,131,877 A * | 10/2000 | Kerger | F16K 1/301 137/533.11 |
| 6,253,785 B1 * | 7/2001 | Shumake, Jr. | F16K 21/18 122/504 |
| 6,526,807 B1 | 3/2003 | Doumit et al. | |
| 6,543,471 B1 * | 4/2003 | Carroll | F16K 31/18 122/504 |
| 6,792,967 B1 | 9/2004 | Franklin | |
| 6,895,990 B1 * | 5/2005 | Carroll | F16K 31/26 122/504 |
| 6,899,122 B1 * | 5/2005 | Mele | F16K 31/001 122/504 |
| 7,218,237 B2 | 5/2007 | Kates | |
| 7,424,896 B1 * | 9/2008 | Martin | F16K 31/001 122/504 |
| 7,562,673 B1 * | 7/2009 | Martin | F16K 31/001 122/504 |
| 7,665,482 B2 * | 2/2010 | McLean | F16K 31/32 137/410 |
| 7,703,476 B1 * | 4/2010 | Carroll | F16K 31/26 122/505 |
| 7,866,336 B1 * | 1/2011 | Gutierrez | F16K 31/001 137/312 |
| 8,006,714 B1 * | 8/2011 | Martin | A47L 15/421 122/14.3 |
| 8,061,380 B1 * | 11/2011 | Martin | F16K 17/40 122/14.3 |
| 8,443,823 B1 * | 5/2013 | Prager | F16K 17/40 137/312 |
| 8,776,824 B2 | 7/2014 | Yao | |
| 2006/0244616 A1 * | 11/2006 | Hill | G01M 3/045 340/604 |
| 2014/0026987 A1 * | 1/2014 | Ayers | E21B 34/00 137/533.11 |
| 2014/0116540 A1 * | 5/2014 | Waldor | F16K 15/183 137/533.11 |

* cited by examiner

WATER LEAK DETECTION AND PREVENTION DEVICE

PRIORITY

In accordance with 37 C.F.R. 1.76, a claim of priority is included in an Application Data Sheet filed concurrently herewith. Accordingly, the present invention claims priority under 35 U.S.C. § 119(e), 120, 121, and/or 365(c) to U.S. Provisional Patent Application No. 62/249,969, entitled "WATER LEAK DETECTION AND PREVENTION DEVICE", filed Nov. 3, 2015. The contents of the above referenced application are incorporated herein by reference in its entirety.

FIELD OF THE INVENTION

The present invention relates to a water and moisture detection device, and more particularly, to a sensor detection and prevention system that, following the detection of water leaks from a water-dependent plumbing line in a commercial or residential setting, obstructs the incoming water flow.

BACKGROUND OF THE INVENTION

Water leaks are a common problem associated with air conditioners, hot water heaters, washing machines, and various other water-dependent appliances used in buildings such as homes, townhouses, apartments, mobile homes, and offices. Unfortunately, water leaks are typically detected only after a substantial leak or a substantial accumulation of water has developed. Thus, it would be advantageous to have the benefit of an early-warning and prevention system for detecting these common water leaks before costly repairs become necessary to correct resulting damages and protect further damage therefrom.

Maintaining and protecting a commercial or residential setting can be difficult and costly. Conditions such as fires, gas leaks, etc. are a danger to the occupants and the structure. Other malfunctions, such as water leaks in plumbing, are not necessarily dangerous for the occupants, but can nevertheless cause considerable damage. In many cases, an adverse condition created by water leakage is not detected in its early stages when the damage and/or danger are relatively small. Water leaks are always inconvenient and may cause incidental damage to furniture, electrical equipment, and other property. Furthermore, this problem is compounded by the prevalence of aging appliances, aging water pipes, and deteriorated joints therein.

There have been many developments in the art seeking to detect water leaks occurring in water-related appliances and the like. A water detector may be an electronic device designed to detect the presence of water and provide an alert in time to limit or allow prevention of water damage. Prior art designs are generally comprised of a small cable or device that lies flat on a floor and relies on the electrical conductivity of water to decrease the resistance across two contacts. When sufficient water is present to bridge the contacts, the device sounds an audible alarm together with signaling. Such devices are useful in a normally occupied area with an infrastructure that has the potential to leak water, such as an HVAC, water pipes, drain pipes, vending machines, dehumidifiers, or water tanks. For instance, U.S. Pat. No. 5,188,143 discloses a water leakage detector sensitive to the presence of moisture and adapted for installation around a water vessel. The detector has an elongated, flexible sensing strip comprised of a pair of conductors separated by insulation. Each conductor includes an electrode coupled with a wire lead extending via a cable to an electrical plug. A circuit housing having an audible alarm operably connected to an electrical socket adapted to detachably connect with the plug is provided.

Although prior art water detectors utilize warning sounds to notify of a water leak and are equipped with a certain detection function in the event that the user is away from the home or commercial establishment, they are unable to immediately notify the user about the water leakage. Thus, by the time the user is aware of the water leakage, the water may have accumulated to a level to cause significant damage to the floor, carpet, interior decoration or furniture, resulting in expensive remodeling or handy work for the owner. In other words, such a conventional water leakage detection system with warning sounds is not of practical use if the user is not always present. Furthermore, the reliability of these water leak detection devices can be questionable because they rely on electronic means for sensing the presence of moisture or fluid. These devices are susceptible to not being triggered by a water leak because of a reliance on electronic or conductive means for sensing the presence of moisture or fluid. For example, U.S. Pat. No. 4,843,305 discloses an apparatus for sensing leaks in water pipes based upon the conductivity of spaced-apart pairs of insulated conductors which are wrapped around the pipe. Unfortunately, leaking water may not always establish contact with all exposed areas of the insulated conductors, or the leaking water may not adhere to the conductors, thereby failing to signal a leak. Additionally, corrosion or the loss of electricity or power from batteries provides another failure point. Similarly, U.S. Pat. No. 4,374,379 teaches a moisture sensing apparatus for pipes that also uses a pair of spaced-apart electrical conductors partially positioned in an elongated flexible insulator which is circumferentially affixed to such pipe. The partially exposed electrical connectors are oppositely disposed relative to the pipe. An alarm actuating circuit is interconnected with the conductors and configured to initiate the alarm when water bridges the spaced apart conductors. However, this apparatus is insensitive to small leaks where water droplets are unable to bridge the sensing electrode gap disposed on the opposite sides of the sensor assembly.

Furthermore, there exists leak detection devices that have electronic sensor elements, such as described above, that measure the conductivity of the water and use such a detection means to energize a solenoid or other such device to turn off an associated water valve. Unfortunately, the electronic circuitry adds cost and reduces reliability, as discussed above. It also requires the presence of electrical power to function. Thus, if a water leak were to occur coincidentally with an electrical power outage, such as may occur with a large storm, the valve will fail to accomplish its purpose unless auxiliary power is available.

There are several prior art devices that provide water shutoff protection utilizing a water sensor that changes physical properties when placed in contact with water, resulting in activation of a valve shutoff device. For instance, U.S. Pat. No. 2,798,503 utilizes a water softenable link that dissolves when coming into contact with water leaking from a water heater into an associated drip pan. As described, the cable attaching the water softenable link to the shutoff valve must be positioned directly beneath the shutoff valve so that the softenable link can be anchored in the drip pan. While appropriate for this installation, it would not provide the flexibility to be applicable on other applications. U.S. Pat. No. 3,920,031 describes a water shutoff device associated with a water heater application. The water detection means involves the use of a water-soluble material held in compression by a spring. The water detection means is placed in a drip pan that surrounds the base of the water heater such that, as water leaks from the faulty water heater, it will reach a level to dissolve the detection means, which in turn releases a spring driven valve that is plumbed into the water supply line of the water heater. U.S. Pat. No. 6,024,116 provides a water softenable latch that, when exposed to water, will release a valve mechanism from its open to closed state, thus turning off the water and gas supply in a water heater. Unfortunately, the installation of such shutoff devices described above requires intensive plumbing skills or would involve hiring a licensed plumber to comply with local building codes.

Thus, what is lacking in the art is a water leak detection and prevention device whereby the leak detector utilizes a water soluble sensor coupled with a water shut-off device to provide obstruction of incoming water through a water pipe using a spring-loaded plunger for use with clothes washing machines, dishwashing machines, toilets, sinks, refrigerators, or the like, that is easily installed and does not require electrical or battery power for operation.

SUMMARY OF THE INVENTION

A water leak detection and prevention device having a leak detection mechanism positioned near a water-dependent appliance to monitor for moisture due to a leak and a leak prevention system connected to the leak detection apparatus. The leak prevention system is in fluid communication with a water pipe attached to the water-dependent appliance, and positioned in-line with the water pipe. The leak prevention system is comprised of a water-line coupling having a water detection mechanism for releasing an obstructive object to block the flow of water when triggered by the presence of water by the leak detection apparatus. The obstructive object, e.g. ball, is positioned above the piping and released into the flow of water, whereby gravity and water pressure from incoming water flow in the water pipe holds the ball firmly against a seal or seat within the water-line coupling and prevents further water leakage by blocking the flow of water therethrough.

Accordingly, it is an objective of the instant invention to provide a water leak detection and prevention device with a mechanism for obstructing water flow through a water pipe in the event of the detection of water or moisture.

It is another objective of the present invention to provide a water leak detection and prevention device that can be installed by the average homeowner.

Still another objective of the present invention is to provide a water leak detection and prevention device that provides a central bore through the water-line coupling that allows water to flow unobstructed therethrough in normal operation, but is closed when a leak is detected.

Another objective of the present invention is to provide a water leak detection and prevention device that provides a compact, simple water obstruction in the event of a water leak.

It is still another objective of the present invention to provide a water leak detection and prevention device which utilizes a water-soluble substance in compression or tension mode in the leak detection apparatus to detect the presence of moisture or a water leak.

Yet another objective of the present invention is to provide a water leak detection and prevention device which maintains normal operating condition of the water pipe when the water soluble leak detection apparatus is not activated.

Still yet another objective of the present invention is to provide a water leak detection and prevention device which is able to completely enclose the leakage of water in a water pipe such that the water does not flow or leak out, in order to keep the floor dry and clean without causing wetness to the interior décor of the home or establishment and its furnishings.

Yet a further objective of the present invention is to provide a water leak detection and prevention device for detecting water leaks without a requirement for batteries or any other type of electrical power which may cause safety hazards if faults occur.

Still yet a further objective of the present invention is to provide a water leak detection and prevention device that utilizes gravity to place an obstruction in the water line in response to a detected leak.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

Figure 1:
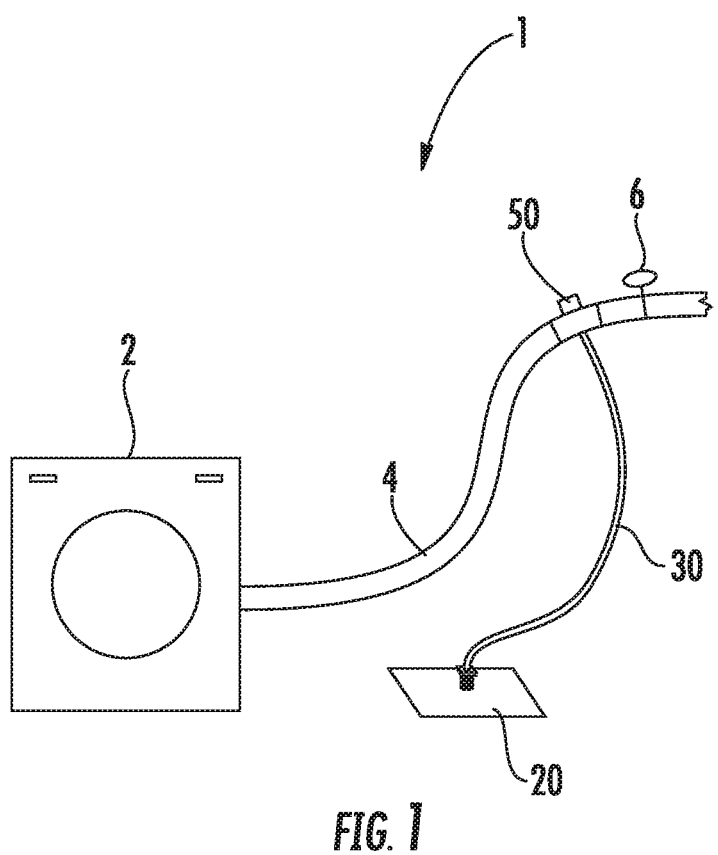
FIG. 1 is a pictorial representation of the instant invention.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

As shown in FIG. 1, a water leak detection and prevention device 1 is comprised of a leak detection apparatus 20 positioned near a water-dependent appliance 2 to monitor for moisture due to a leak and a leak prevention system 50 connected to the leak detection apparatus 20 and in fluid communication with a water pipe 4 attached to the water-dependent appliance 2. It is contemplated that the leak prevention system 50 is situated nearest the water supply valve 6 so that, upon the presence of a leak, water is immediately obstructed from flowing through the water pipe 4.

Figure 2:
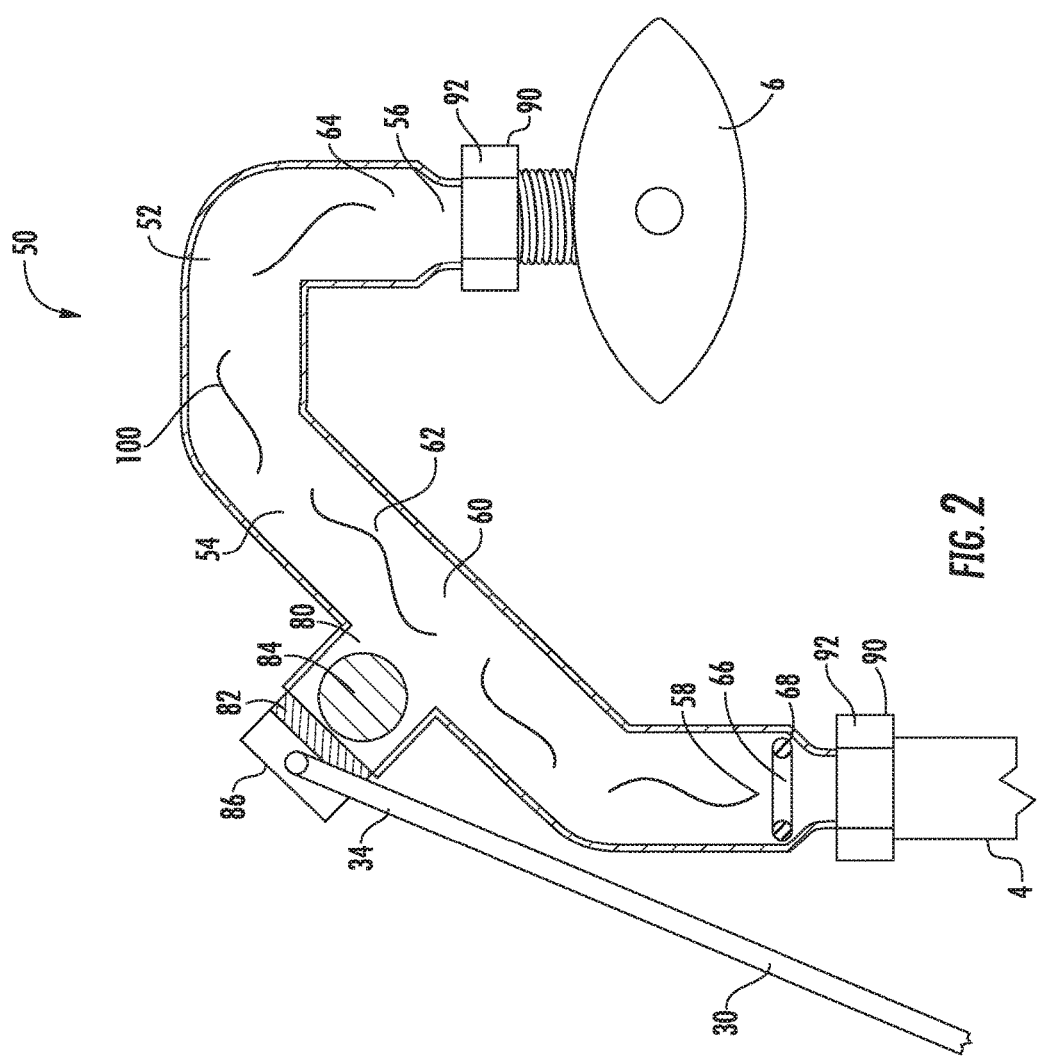
FIG. 2 is a top cross-sectional view of the leak prevention system of the instant invention when not activated.
Figure 3:
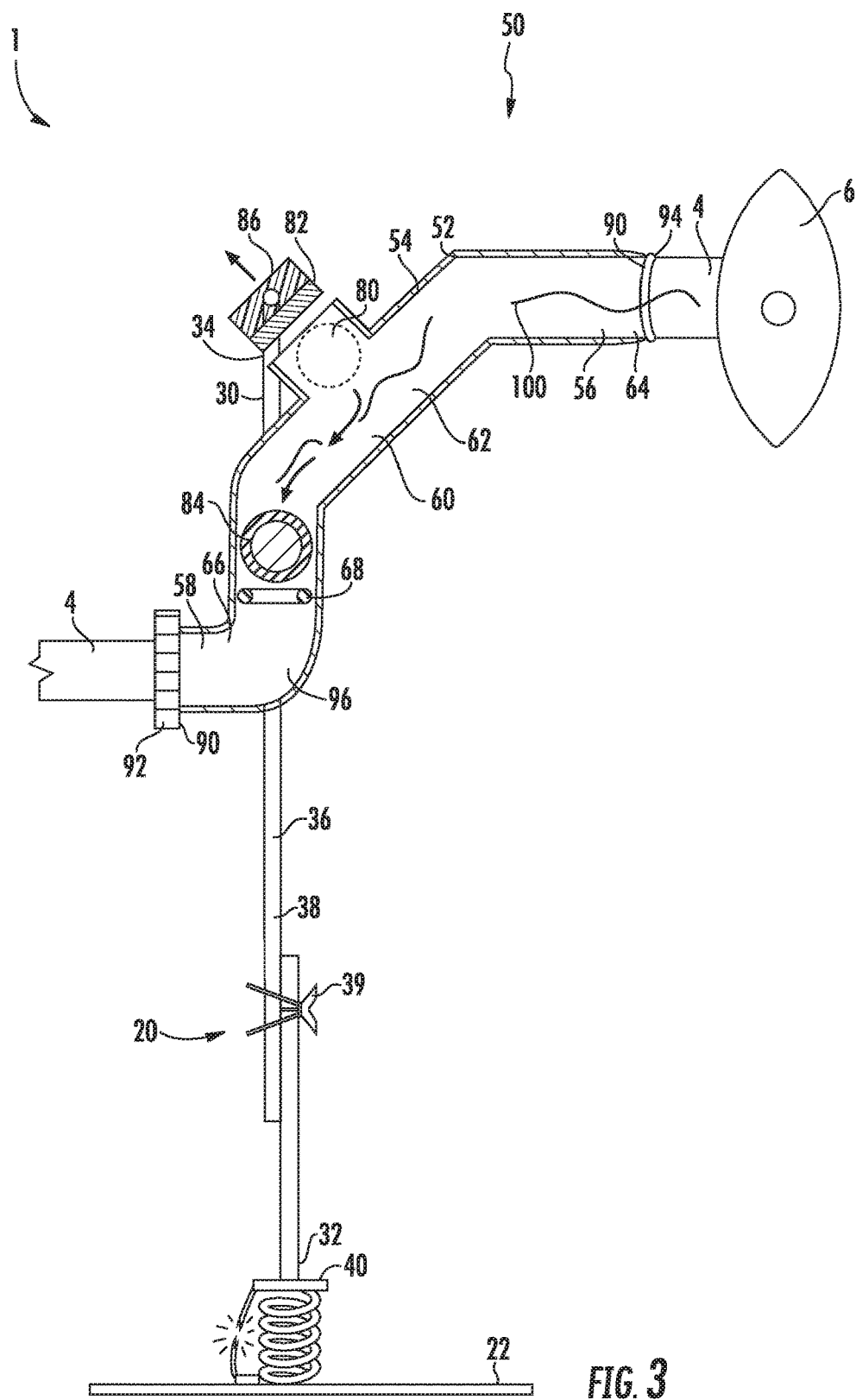
FIG. 3 is a top cross-sectional view of the leak prevention system of the instant invention when activated.

As shown in FIGS. 2 and 3, the leak prevention system 50 is comprised of a water-line coupling 52 positioned in-line with a water pipe 4. One non-limiting embodiment of the water-line coupling 52 includes a T-shaped valve 54 having an inlet opening 56, outlet opening 58, a center bore 60, and a port 80 thereinbetween the inlet and outlet openings, 56 and 58. The water-line coupling 52 is positioned such that the flow of water 100 within a water pipe 4 flows from the inlet opening 56 to the outlet opening 58 uninterrupted. The water-line coupling 52 is positioned so that the port 80 sits above the flow of water 100 within the pipe, placing the port 80 in a relatively vertical position. This construction allows gravity to place an obstruction object, such as a ball 84, within the flowing water when needed to block the water flow. Additionally, the water-line coupling 52 is contemplated as being installed nearest the water supply valve 6. The inlet and outlet opening, 56 and 58, may include a hose coupling 90, such as but not limited to cam and groove, quick connect, expansion ring, air king, garden hose thread, ground joint, hose clamp, soldering, glue joint or the like. By way of example, a compression fitting 92 is used in FIG. 2 as the hose coupling 90. Also by way of example, a combination solder joint 94 on the inlet opening 56 and a compression fitting 92 on the outlet opening 58, as illustrated in FIG. 3, is used in situations where the water pipe 4 is made of copper at the water supply valve 6, which is common. A hose coupling 90 is a connector on the end of the inlet or outlet openings, 56 and 58, to connect (or couple) it with the water pipe 4.

The port 80 is located between the inlet and outlet openings, 56 and 58. The port 80 includes a carrier 82 that, when triggered by the presence of moisture or water by the leak detection apparatus 20, releases a ball 84 or other obstructive object. The ball 84 is positioned below the carrier 82, and held in placed by the carrier 82 until it is released into the center bore 60, whereby water pressure from incoming water flow 100 in the water pipe 4 holds the ball 84 firmly within the water-line coupling 52 at the outlet opening 58 and prevents further water leakage by blocking the entry of water therethrough. Gravity forces the ball 84 to fall within the center bore 60 and obstructs the flow of water at the tapered end of the center bore 60, discussed further below. The port 80 has a water-tight seal 86. The ball 84 is sized to obstruct water when released by the carrier 82 into the center bore 60. It is contemplated that the carrier 82 is comprised of a magnet that magnetically holds a metal or otherwise magnetic ball 84 in place; whereby release of the ball allows gravity to pull the ball into the flow of water passing through the pipe and valve. The ball 84 would be corrosion resistant and may be coated with plastic or rubber, yet still have the magnetic properties to remain held in place by the carrier 82.

The center bore 60 is comprised of a central portion 62 and opposite tapered ends 64 and 66. The first tapered end 64 begins at the inlet opening 56 and the second tapered end 66 begins at the outlet opening 58. The second tapered end 66 includes an O-ring 68 about the periphery thereof, and is sized to be smaller than the diameter of the ball 84. An alternative embodiment of the instant invention includes an elbow joint 96 at the outlet opening 58, whereby it provides a secondary means of obstructing the flow of water 100 in the water pipe 4, as the ball 84 would not be able to pass through the elbow joint 96, shown in FIG. 3. It should also be noted that in place of the O-ring 68, tapers or seats that may include molded in place rubber, Teflon plastic, copper or the like may be utilized without departing from the scope of the invention.

When the water-line coupling 52 is attached to the water pipe 4, it is water-tight. The magnetic carrier 82 is set in place with the ball 84 attached thereto, as shown in FIG. 2. Upon the presence of moisture or water, detected by the leak detection apparatus 20, the carrier 82 releases the ball 84, as shown in FIG. 3. A connector 30, which is attached to the magnetic carrier 82 on one end 34 and the leak detection apparatus 20 on the other end 32, allows the magnetic carrier 82 to release the ball 84. Upon release, gravity forces the ball 84 to fall out of the port 80 and into the center bore 60. The flow of water 100 will then push the ball 84 against the tapered end 66 of the center bore 60 at the outlet opening 58 and provide an obstructed passage for the flow of water 100. The force of the flow of water 100 will continue to push the ball 84 against the tapered end 66 and O-ring 68, which only creates more sealing force between the ball 84 and O-ring 68, thereby creating a tighter seal. This seal obstructs the flow of water 100 from being introduced into the rest of the water pipe 4 where the leak is taking place.

Figure 4:
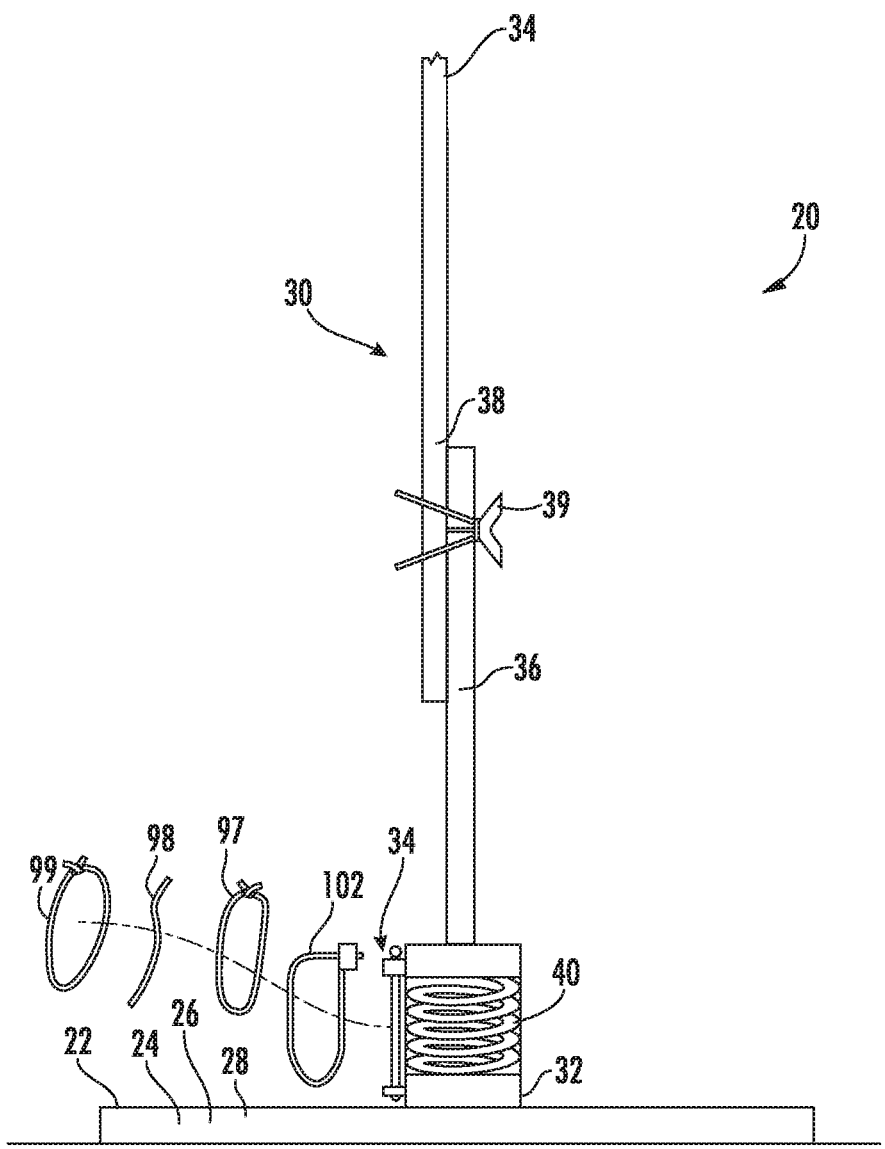
FIG. 4 is a side view of the leak detection apparatus of the instant invention.

As shown in FIGS. 1 and 4, the leak detection apparatus 20 is comprised of a sheet 22 and connector 30. The sheet 22 is positioned near a water-dependent appliance 2 to monitor for moisture due to a leak, and the connector 30 is attached on one end 32 to the sheet 22 and on the opposite end 34 to the magnetic carrier 82. The sheet 22 is contemplated as being constructed of an absorbent or water soluble material. In one embodiment, the sheet 22 is constructed of a water-soluble fabric 24 or threads which are composed of webs of hot water soluble polyvinyl alcohol fibers 26 and a water-soluble resin 28 fixably adhered to the fibers 26 of which the fabric 24 is composed.

The connector 30 is comprised of an adjustable length push rod assembly 36 and a spring-loaded trigger mechanism 40. The spring-loaded trigger mechanism 40 is placed atop the sheet 22 and held in compression by a water-soluble retention component 42. The water-soluble retention component 42 is constructed, similarly to the sheet 22, of a water-soluble fabric which is composed of webs of hot water soluble polyvinyl alcohol fibers 26 and a water-soluble resin 28 fixably adhered to the fibers of which the fabric is composed. Upon the presence of water or moisture, the water-soluble retention component 42 releases the compression on the spring-loaded trigger mechanism 40, which can thereby move and exact a force on the connector 30, which in turn causes the magnetic carrier 82 to move away from the ball and thereby release of the ball 84 from the magnetic carrier 82 on the opposite end 34 of the connector 30. The water-soluble retention component 42 is in fluid communication with the sheet 22 so that any water or moisture on the sheet 22 or water-soluble retention component 42 causes a release of compression on the spring-loaded trigger mechanism 40. The push rod assembly 36 includes an adjustable arm and a screw wing nut 39 to allow flexibility in height discrepancies in water pipes 4 in any home or business. The water-soluble retention component 42 can be formed into a string 97, a cord 98, a thread 99, a zip tie 102, or any other attachment component which can hold the spring-loaded trigger mechanism 40 under tension, and allow it to be released upon the presence of water or moisture.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A water leak detection and prevention device comprising:
    a leak detection apparatus, said leak detection apparatus including a sheet having a top and a bottom, and a spring-loaded trigger mechanism having an upper portion and a lower portion, said lower portion of said spring-loaded trigger mechanism fluidly coupled with said top of said sheet, said spring-loaded trigger mechanism including a water-soluble retention component, said water-soluble retention component coupled to said spring-loaded trigger mechanism whereby release of said water-soluble retention component causes said spring-loaded trigger mechanism to release and activate;
    a leak prevention system, said leak prevention system comprising a water-line coupling, said water-line coupling having an inlet, an outlet, and a center bore, said water-line coupling further including an obstruction object within said water-line coupling, said obstruction object releasably coupled to a portion of said water-line coupling whereby detection of a leak by said leak detection apparatus causes said obstruction object to be released from said water-line coupling and obstruct a flow of water through said water-line coupling outlet; and
    a connector, said connector having a first end and a second end, said connector first end coupled to said upper portion of said spring-loaded trigger mechanism of said leak detection apparatus, said connector second end coupled to said water-line coupling of said leak prevention system.

2. The water leak detection and prevention device of claim 1, wherein said water-soluble retention component is constructed of webs of water soluble polyvinyl alcohol and a water-soluble resin fixably adhered to said water soluble polyvinyl alcohol fibers.

3. The water leak detection and prevention device of claim 1, wherein said water-line coupling further comprises a port, said port housing said obstruction object within said water-line coupling in a position elevated from the flow of water through said water-line coupling.

4. The water leak detection and prevention device of claim 1, wherein said water-line coupling further comprises a carrier, said carrier positioned within said water-line coupling.

5. The water leak detection and prevention device of claim 4, wherein said obstruction object is releasably coupled to said carrier.

6. The water leak detection and prevention device of claim 5, wherein said obstruction object is magnetically coupled to said carrier.

7. The water leak detection and prevention device of claim 6, wherein said second end of said connector is magnetically coupled to said obstruction object so that said obstruction object is releasably coupled to said carrier and said second end of said connector is releasably coupled to a portion of said water-line coupling where said carrier is positioned.

8. The water leak detection and prevention device of claim 1, wherein said obstruction object is magnetically coupled to said portion of said water-line coupling.

9. The water leak detection and prevention device of claim 8, wherein said second end of said connector is magnetically coupled to said portion of said water-line coupling and said obstruction object.

10. The water leak detection and prevention device of claim 1, wherein said water-soluble retention component is a water-soluble cord.

11. The water leak detection and prevention device of claim 1, wherein said water-soluble retention component is a water-soluble zip tie.

12. The water leak detection and prevention device of claim 1, wherein said obstruction object is a ball, said ball having a metallic inner portion and a cover surface.

13. The water leak detection and prevention device of claim 12, wherein said cover surface of said ball is rubber.

14. The water leak detection and prevention device of claim 12, wherein said water-line coupling outlet includes a tapered region and a gasket.

15. The method of detecting and preventing a water leak, comprising the steps of:
    absorbing moisture leaking from a water-line in a water-soluble sheet;
    transferring absorbed moisture from said water-soluble sheet to a water-soluble retention component;
    breaking said water-soluble retention component;
    releasing a spring-loaded trigger mechanism;
    vertically displacing a connector;
    moving a second end of said connector away from a water-line coupling;
    releasing an obstruction object within said water-line coupling; and
    blocking the flow of water through said water-line coupling with said obstruction object.

16. The method of detecting and preventing a water leak of claim 15, wherein said obstruction object is a ball, said ball having a metallic inner portion and a rubberized outer cover.

17. The method of detecting and preventing a water leak of claim 16, wherein said obstruction object is released from a port within said water-line coupling.

18. The method of detecting and preventing a water leak of claim 15, wherein said obstruction object blocks the flow of water through said water-line coupling at a narrowing at an outlet of said water line coupling.

19. The method of detecting and preventing a water leak of claim 15, further comprising the step of releasably coupling an obstruction object within a portion of said water-line coupling.

20. The method of detecting and preventing a water leak of claim 19, wherein said portion of said water-line coupling is a port within said water-line coupling.

* * * * *